(12) United States Patent
Belmonte (10) Patent No.: US 8,341,413 B2
(45) Date of Patent: Dec. 25, 2012

(54) METHOD OF COMMUNICATING A DIGITAL SIGNATURE TO CERTIFY A TRANSMISSION, ASSOCIATED SYSTEM AND AIRCRAFT

(75) Inventor: Roger Belmonte, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 132 days.

(21) Appl. No.: 12/552,086

(22) Filed: Sep. 1, 2009

(65) Prior Publication Data

US 2010/0100745 A1   Apr. 22, 2010

(30) Foreign Application Priority Data

Sep. 3, 2008  (FR) ...................................... 08 55918

(51) Int. Cl.
*H04L 29/06* (2006.01)
(52) U.S. Cl. ........................... 713/176; 705/67; 713/180
(58) Field of Classification Search ................. 713/176, 713/180; 705/67
See application file for complete search history.

(56) References Cited

U.S. PATENT DOCUMENTS

| | | | | |
|---|---|---|---|---|
| 5,018,196 | A * | 5/1991 | Takaragi et al. ................ | 380/30 |
| 6,816,762 | B2 * | 11/2004 | Hensey et al. .................. | 701/35 |
| 2003/0109973 | A1 * | 6/2003 | Hensey et al. .................. | 701/35 |
| 2005/0120217 | A1 * | 6/2005 | Fifield et al. ................... | 713/176 |
| 2006/0004771 | A1 * | 1/2006 | Enenkiel ........................ | 707/10 |

OTHER PUBLICATIONS

A. Menezes, et al., "Handbook of Applied Cryptography", CRC Series on Discrete Mathematics and its Applications, XP-002521321, 1997, 7 pages.
Bob Stephens, "Security Architecture for Aeronautical Networks", Digital Avionics Systems Conference, IEEE, XP-010764913, Oct. 24, 2004, pp. 8.E.2-1-8.E.2-19.
Aloke Roy, "Secure Aircraft Communications Addressing and Reporting System (ACARS)", Institute of Electrical and Electronics Engineers, vol. 2, XP-002282061, Oct. 14, 2001, pp. 7.A.2-1-7.A.2-11.
Curtis Risley, et al., "Experimental Encryption of Aircraft Communications Addressing and Reporting System (ACARS) Aeronautical Operational Control (AOC) Messages", IEEE, vol. 2, XP-002282062, Oct. 14, 2001, pp. 7.D.4-1-7.D.4-8.
Aloke Roy, "Security Strategy for US Air Force to use Commercial Data Link", IEEE vol. 2, XP-010522799, pp. 7.E.4-1-7.E.4-8.

* cited by examiner

*Primary Examiner* — Jason K. Gee
*Assistant Examiner* — Ayoub Alata
(74) *Attorney, Agent, or Firm* — Oblon, Spivak, McClelland, Maier & Neustadt, L.L.P.

(57) ABSTRACT

A communication method intended to ensure the receipt of digital data by at least one remote entity, and an associated system, in particular in the context of data transfer with an aircraft, includes receiving of numerical data by at least one remote entity, digital signing of the data received by the remote entity so as to generate a digital signature, and transmitting the digital signature to a local entity. The digital signature is transmitted with at least one identification information item for the received and signed data. The identification information item is smaller size than the received data.

15 Claims, 8 Drawing Sheets

METHOD OF COMMUNICATING A DIGITAL SIGNATURE TO CERTIFY A TRANSMISSION, ASSOCIATED SYSTEM AND AIRCRAFT

The invention relates to a communication method used during certification of a transmission (or receipt) of digital data to (or by) at least one remote entity, and relates to an associated system, in particular in the context of data transfer with an aircraft.

Data-processing systems nowadays implement a great number of transmissions and exchanges of digital data. It thus has been possible to set up transmission protocols providing for receipting of data that are transmitted to the sender of the data.

Certain data-processing systems nonetheless require a degree of guarantee more significant than the standard receipting signal, in order to certify that the addressee indeed specifically received the data that were sent thereto.

This is particularly the case in the aeronautical field in which physical documents have given way to electronic documents. The latter generally are transmitted from or to an aircraft by using standard communication means. Examples of a digital transmission system provided for an aircraft are described in patent applications WO 2007/012727 and EP 1 100 230.

For probative purposes, it is desired to have an effective indication according to which the airplane specifically received the electronic documents that were transmitted thereto.

Figure 1:
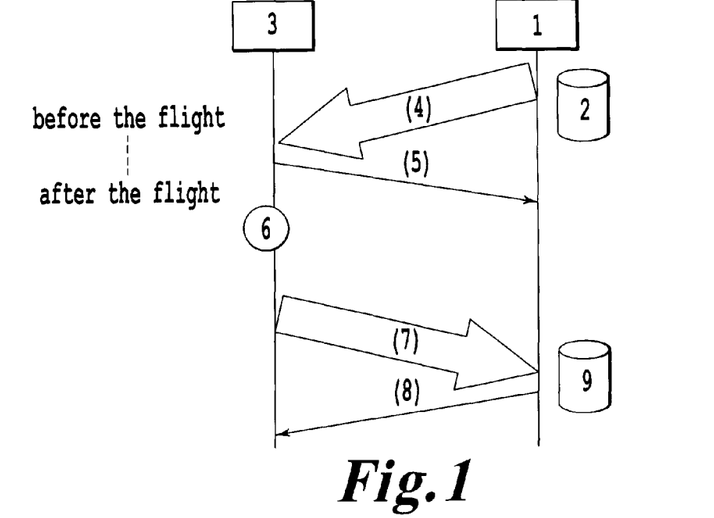
FIG. 1 illustrates the exchanges of a communication between a remote entity and a local station, according to the prior art.

For this purpose, airline regulations imposed the digital signature of certain sensitive documents during the preparation and conclusion of each flight, as well as during certain maintenance operations. FIG. 1 illustrates the current mechanisms applied to these documents, here electronic flight folders (EFF for "electronic flight folder") used by the airplanes.

Centralized ground infrastructures 1 of an airline company prepare EFF flight files 2 for all the airplanes 3 in the fleet. Prior to the flight, these files constituting the flight folder of an airplane are transmitted (4), by radio means for example, to the airplane 3 which acknowledges (5) receipt thereof with the aid of a standard receipting message. After the flight, when the airplane is on the ground, it (3) signs (6) the EFF flight folder before transmitting it (7), again by radio means, to the ground infrastructure 1. The latter acknowledges receipt (8) and stores the signed files 9 received sometimes for several years. These signed files (9) attest over the long term to the conditions of the flight that took place.

The digital signature is, for example, implemented by the use of a public key infrastructure (PKI or "Public Key Infrastructure") according to which a digital imprint is determined from the data and is coded with the aid of a first key, typically private. Then the resulting signature is transmitted with the initial data to an addressee, who can authenticate the sender and the integrity of the data with the aid of a second key, typically public, associated with the private key. To do so, with the aid of the public key, the addressee decodes the received signature in order to determine the imprint transmitted and at the same time calculates another imprint from the data received with the signature, then compares the two imprints obtained in this way.

Now, the transmission (7) of these signed data is added to the numerous maintenance communications following a flight. These initial data with the associated signature thus can bring about a congestion of the airplane-ground communication means provided for transmission which have, in the aeronautical area for the systems already in place, a limited pass band.

In fact, on the one hand, the applications on board an airplane are more and more numerous and heavy in digital data loaded from the ground station before the flight. This increase in data makes it possible to improve the maintenance procedures, to have more precise and better-updated data, or even to guarantee a higher rate of availability of the airplane (rate of dispatch), but on the other hand proportionally increase the volume of data to be transmitted after the flight. By way of example, these digital data can relate to flight plans, weather bulletins, airport information items, parametrizing of the airplane, passenger listings, but also new software imported into the airplane, etc.

On the other hand, several remote entities frequently wish to communicate with a central site at the same time, increasing simultaneous communications even more. This is the case when several airplanes frequent the same airport and simultaneously transmit their end-of-flight reports with the certification of data received before the flight.

The accumulation of post-flight transmissions therefore can lead to a saturation of the communication means (of each airplane or of the ground station) at each end of flight.

The invention seeks to remedy these drawbacks by proposing in particular an optimization of the exchanges between the remote entities and the central site, also referred to below as ground station or local entity.

For this purpose, the invention relates in particular to a communication method comprising a step of receiving of digital data by at least one remote entity, a step of digital signing of the said data received by the said remote entity so as to generate a digital signature and a step of transmitting the said digital signature to a local entity, a method in which the said digital signature is transmitted with at least one identification information item for the said received and signed data, the said identification information item being of lesser size than the said data received.

This invention applies to any type of information system, particularly in the management of supplies, in the management of traceability (transmission of files listing products at different processing entities), in transports, and in particular in the field of air transports.

According to the invention, the transmission of received documents that are signed is avoided by generally transmitting only a small quantity of information (the signature without the data initially received, and a reference to the data to which the signature applies) compared with the data received by the remote entity. In this way the traffic on the transmission network is reduced for each remote entity, for example each airplane of a fleet. The associated communication costs also are reduced.

By conserving the communication resources themselves, the number of data exchanges thus can be increased, for example by increasing the number of airplanes taken on by a single ground station.

By virtue of the invention and the identification information transmitted, the local entity can link each received signature to one or more copy/copies of the data that it is holding on site. By thus linking the received signature with these data stored on site, the local entity has certification elements for the sending of electric files, elements that are desired, for example, in the context of aeronautical standards.

It also is noted that this invention provides another advantage in that instead of storing the signed data for each of the transmitting remote entities, the local entity is going to retain only a single data version (unsigned) common to a group of remote entities and each of the corresponding electronic signatures transmitted by the remote entities. This advantage is all the more important since there exists a great number of information items common to several entities such as the airplanes (for example a weather bulletin). In this way, occupancy of the memory in the local entity is reduced in comparison with the known solutions.

According to one embodiment, the step of signing in order to calculate a digital signature comprises the determination of an imprint of the said data received by the said remote entity, then the coding of the said imprint with the aid of a coding key. A hash function, for example MD5 ("Message Digest 5") can be used for calculation of the imprint.

In particular, the integrity data of the said imprint furthermore is calculated, the said coding being performed on the whole consisting of the said imprint and the integrity data. In this way the invention is provided with additional mechanisms for detection of loss of integrity during transmission of the signature. There thus is added a new "streamlined" imprint, for example a hash message or CRC ("Cyclic Redundancy Check") type redundancy data.

Moreover, it is provided that the said coding also is performed on the said at least one identification information item. As a variant, juxtaposing the said at least one identification information item with the said digital signature so as to form a data file to be transmitted to the said local entity is considered. In the first case, since the identification information items are coded, a greater security of transmission is ensured, particularly in the case of use of unsecured networks such as the Internet. In the second case, the identification information items are transmitted in plain language. There results therefrom a streamlined processing by the local entity which can read these information items and associate the received signature with the corresponding digital data without having to decode the received signature.

In one embodiment, the method comprises, prior to the said receipt of the digital data by the remote entity:

a first step of signing of the digital data by the said local entity, and a step of transmitting, by the local entity to the remote entity, of the data and of the first signature generated in this way, the said step of signing by the remote entity being performed on the said first signature so as to form a double signature.

In this embodiment, it is understood that the imprint used for the signature by the remote entity is the received signature of the data.

This configuration makes it possible to integrate a plan for non-repudiation of the sender of initial digital data since the local entity signs the transmitted data. In this case, it may be provided that the remote entity, upon receipt of the said data and of the first signature, verifies the latter with the aid of a coding key.

The double signature resulting from this embodiment of the invention thus offers both a guarantee of authenticity of the senders and receivers, and of integrity of the data.

According to one characteristic of the invention, a plurality of remote entities receives digital data, and each remote entity transmits a said digital signature of the data received accompanied by a said identification information item for the received data, and the said local entity stores, in a database, all the signatures of the plurality of remote entities with the said identification information items, and stores a single copy of each digital datum so that the local entity can link a received signature with a copy held locally.

As already introduced above, the invention thus makes it possible to reduce the memory used on site, by storing only a single version of the digital data. This sole version makes it possible to subsequently verify the received signature.

Generally speaking, in the aeronautical area, the local entity is unique and centralized in a central base ("mainbase") of the airline company. Each airport then has access thereto. There follows therefrom no difficulty in access to copies of the data initially transmitted from any landing airport whatsoever.

However, distributed information systems where each airport accommodates the said independent local entities can be considered. The local entity at the landing of an airplane then does not correspond to the airport of takeoff.

According to one characteristic of the invention, upon receipt of a digital signature accompanied by an identification information item, the local entity sends out, to the sending remote entity, a request for the digital data identified in the said identification information item and no copy of which is stored in the said local entity, By virtue of the arrangements according to the invention, mechanisms are provided to retrieve the referenced data with the signature transmitted by the remote entity but which are not yet known to the local entity. Other airplanes then could again identify these data retrieved with their signatures.

During a flight, the pilots may be led to modify elements of the electronic flight folder. In this case, it is provided that the method comprises, at the said remote entity, a step of modifying the said received digital data, a step of signing of modification data, and transmitting the said signed modification data with the said signature of the digital data. This arrangement makes it possible to transmit and retain, at lower cost, the possible modifications introduced in this way. In fact, transmitting all the initial data integrating the modifications thus is avoided.

In one embodiment, the method comprises, at the local entity:

a step of receiving the said digital signature and the at least one identification information item, a step of local searching, with the aid of the identification information item, for a local copy of the said identified digital data, a step of verifying the said digital signature with the aid of the copy found.

These steps lead to the verification of the signature and in this way bring about the validation of the sending of data to the remote entity. They do not entail any significant extra cost with regard to the saving in transmission obtained by this invention. In fact, the current local search techniques henceforth are more effective and the memories are rapid access.

By virtue of the invention, this "validation" method moreover makes it possible to ensure the integrity of the data initially transmitted from the local entity to the remote entity, since the verification is conducted on the data that the local entity is holding and not those received from the remote entity as in the state of the art.

Correlatively, the invention relates to a communication system comprising means for receipt of digital data on a communication network, means for digital signature of the said received data set up to generate a digital signature and means for transmission of the said digital signature on the said communication network to a local entity, the system being set up to transmit the said digital signature with at least one identification information item for the said received and signed data, the said identification information item being of lesser size than the said received data.

The same advantages as those of the communication method are obtained through this system.

Optionally, the system can comprise means relating to the characteristics of the above communication method.

The invention also applies to an aircraft comprising a communication system such as presented above.

Optionally, the aircraft can comprise means approximating the system characteristics presented above.

The invention likewise concerns an airport system comprising a plurality of aircraft according to the preceding claim and a ground station, the said ground station being capable of storing a copy of the digital data transmitted to the said aircraft and comprising:

means for receipt of a digital signature and of at least one identification information item sent out by one of the said aircraft, means for local search, with the aid of the identification information item, for a copy of the digital data transmitted to the said aircraft, means for verification, with the aid of the copy found, of the said digital signature received from the aircraft.

Such a system has the same advantages as the "validation" method presented above and optionally can comprise means relating to the characteristics of the above method.

In an aeronautical environment, in particular the one linked to the EFF flight folder, this invention offers numerous advantages.

1/ Communication costs in particular are reduced because, on the one hand, the decrease in volume of the data to be exchanged brought about by this invention reduces communication costs, and on the other hand, the current communication infrastructures, which most certainly are limited in terms of performances, can suffice when they were, without the invention, close to saturation.

2/ Performances at the end of a flight also are improved for the EFF: the transmission of information items (signature) is accomplished more rapidly and an enhanced reactivity is obtained with regard to corruption of the data (shortened detection time, much less costly retransmission of the data).

3/ A reduction in communication volumes after the flight also is obtained. In fact, it is during this after-flight period that the greatest number of information items is sent from the airplane to a ground station. The invention thus makes it possible to rationalize certain communications at this critical after-flight moment.

4/ The invention also makes it possible to avoid resorting to new "airplane" communication means intended to cover certain scenarios with heavy data output. The EFF most certainly was designed as an application that uses the new-generation communication means, such as Gatelink, Satcom SBB (for "SATellite COMmunication Swift BroadBand"), but many airline companies, however, do not have the suitable infrastructures, generally for economic reasons (rental payment to the operators). On the other hand, the invention makes it possible to use standard ACARS/ATN (for "Aircraft Communications Addressing and Reporting System/Aeronautical Telecommunication Network") type communication means, much less effective and poorly adapted for transmitting large files (maximum 100 kilobytes under the best of circumstances). In this way, the signature of the documents can be transmitted by these not very effective ACARS-type means.

5/ While the recent and more efficient communication means (Gatelink, Satcom SBB, etc.) do not have worldwide coverage, it is possible by the use of standard, most certainly less effective communication means such as ACARS, to offer a nearly worldwide coverage for the transmission of signatures to the ground station.

6/ Finally, a rationalization of the storage of signed files in the ground station is achieved since, by comparison with the different signatures received, data common to different airplanes is stored only once.

Other features and advantages of the invention also will become apparent in the description below, illustrated by the attached drawings, in which.

The invention is illustrated below through examples drawn from the aeronautical field, but generally relates to any type of information systems. Furthermore, reference generally is made to a single airplane 3. In this case it must be considered that parallel communications are carried out with other airplanes.

Figure 2:
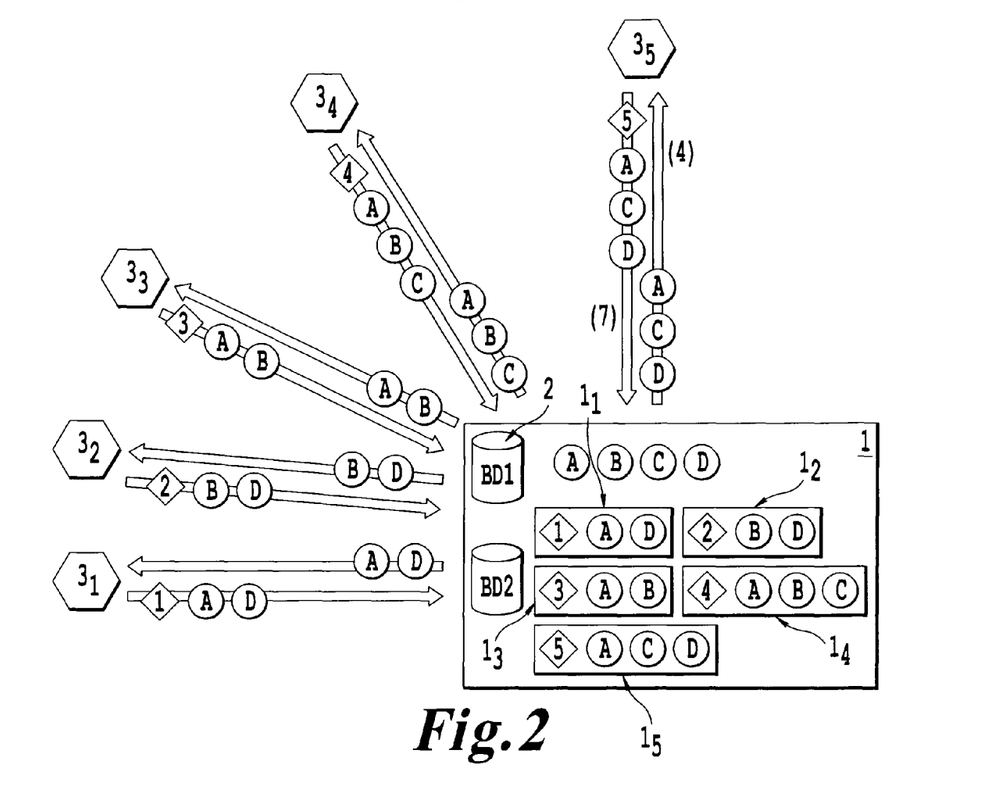
FIG. 2 illustrates the data exchanged during the communication of FIG. 1, and the state of the information items stored by the local station.

FIG. 1 introduced above illustrates the standard processing of data exchanges between a ground station 1 and airplanes 3. FIG. 2 illustrates the case of exchanges with five airplanes $3_1$ to $3_5$. The data exchanges (4) and (7) are shown by the arrows between the ground station 1 and the airplanes $3_i$. On these arrows, there are seen the data sent, for example the files "B" and "D" to airplane $3_2$ for transmission 4, and the signed files "B", "D" with the signature "2" by the airplane $3_2$ for return transmission 7. Each of the airplanes therefore receives files ("A", "B", "C", "D") constituting, for example, their EFF flight folder, then, at the end of the flight, sends back these signed files.

Ground station 1, here a centralized station for the airline company, stores, in the first database BD1, all the files 2 transmitted to the airplanes $3_i$, here files "A", "B", "C", and "D", and in the second database BD2, the files signed $1_i$ (comprising the received files plus the signature produced by the airplane) by each of the airplanes. The storage of several versions of the same file is seen; in our example, file "A" is stored once in the database BD1 and four times in the base BD2.

This centralized ground station 1 is accessible from all the airports, in particular the airport of takeoff and that of landing.

Figure 3:
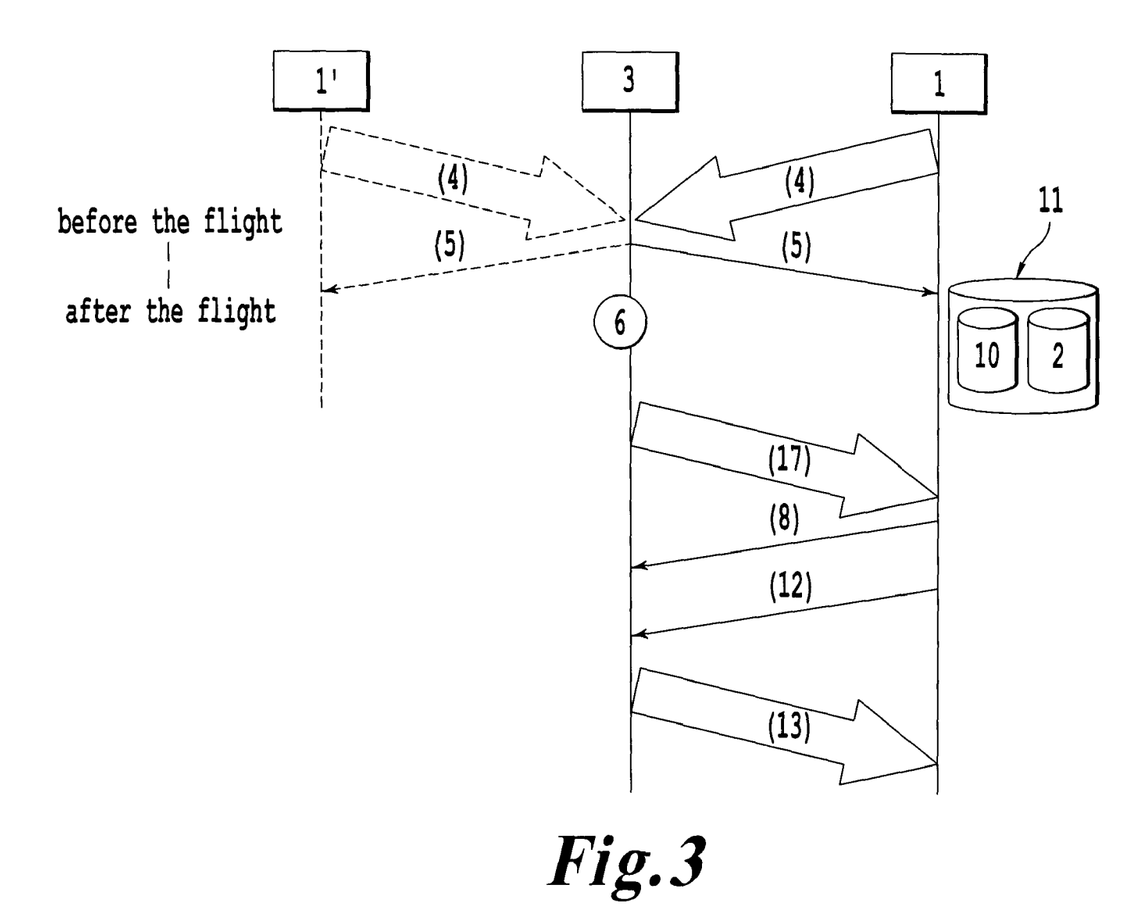
FIG. 3 illustrates, by exchanges of a communication, a first embodiment of this invention.

FIG. 3 shows the general diagram of data exchanges according to the invention. The first exchange phase (references 1 to 5) before the flight is similar to that of FIG. 1.

As a variant, however, the data transmitted during step 4 can originate from a source 1' other than the ground station 1 contemplated by the series of exchanges (see broken-line arrows). This is the case in particular when certain information items must be acquired independently without going through the centralized station 1 of the airline company. For example, when there are communication problems between the infrastructures of the airport and those of the airline company.

Another source 1' can be an emergency server updated periodically from the centralized station 1. Communication networks of the airline company make it possible to connect these two sources in order to produce a copy of the EFF files 2 between them.

After the flight, airplane 3 also signs the files of the flight folder. Contrary to the example of FIG. 1, airplane 3 then transmits (17) to the ground station 1 only an identifier of the signed files, for example a sole number for each signed file, as well as the signatures of these files. The ground station 1 stores these information items 10 (identifiers and signatures) in the same database 11 as the EFF files 2 transmitted initially, and receipts the received data (arrow 8).

As illustrated by the width of the arrow 17, the identifiers and the signatures of the files represent a quantity of data considerably less than the files themselves that are transmitted according to the state of the art (arrow 7 of FIG. 1.)

In the case in which the ground station 1 does not possess the files 2 referenced by the identifiers 10 received or is unable to obtain them directly from the source 1', it requests (request 12) these files from airplane 3 which sends them (13) thereto in standard manner during an exchange subsequent to that (17) of the signature.

Figure 4:
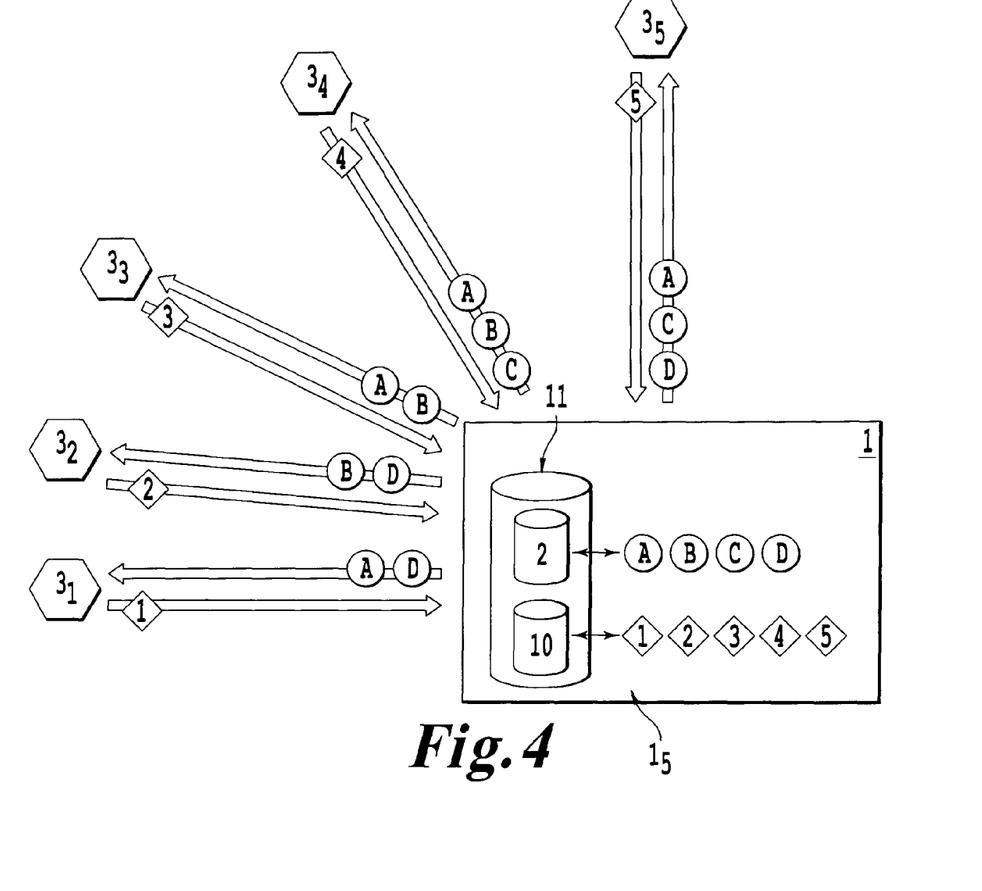
FIG. 4 illustrates the data exchanged during the communication of FIG. 3, and the state of the information items stored by the local station.

As illustrated on FIG. 4, the ground station 1 from then on stores no more than a single version of each of the files 2 of data ("A", "B", "C", "D") that were transmitted to airplanes $3_i$. By virtue of the identifiers 10 associated with the signatures, the ground station 1 can find the initial EFF files 2 that correspond to the received signatures.

The data 2 and information items received 10 constitute a summary of the conditions of the flight to which they relate, and are retained for probative purposes by the ground station 1, for example for subsequent inquiries.

Use of these data and information items then requires reading of the identifiers 10 received, recovery of the files 2 so referenced and verification of the signature 10 with regard to these files. These steps are described later in further detail.

Figure 5:
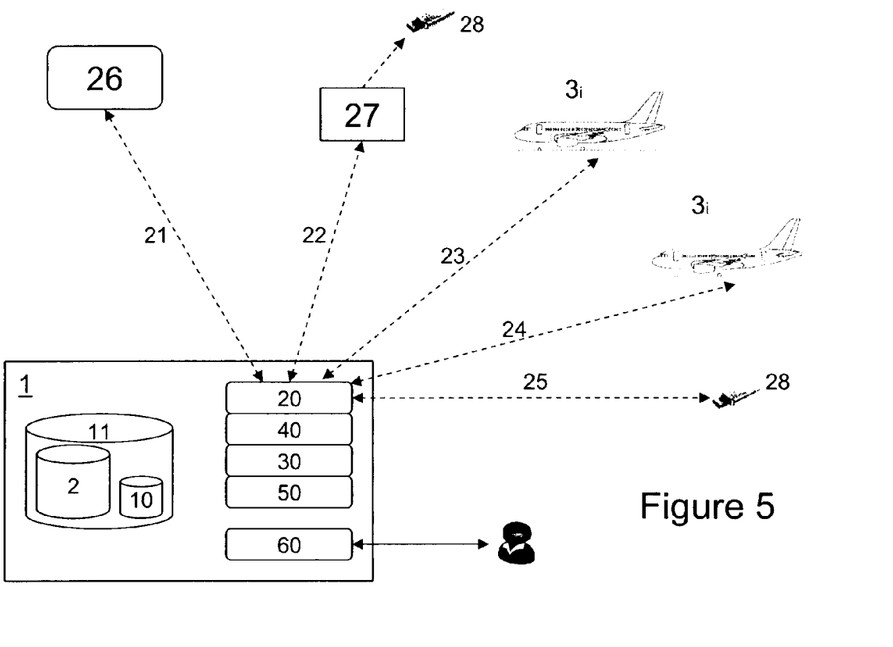
FIG. 5 shows an example of aeronautical implementation of the system according to the invention, centered on the local station of FIG. 3.

On FIG. 5 there has been shown in greater detail a local entity according to the invention, here the ground station 1, implemented in the form of a computer including a microprocessor and memory means. There is found therein the database 11 comprising the EFF files 2 and the received information items 10 (identifiers and signatures).

The database 11 is implemented in a storage memory of the ground station and can store any kind of datum (for example files referred to as pdf, files in a particular format, etc.).

It also has tables storing received signatures 10 and creates links between these signatures and the stored files 2. At this time, it also stores in memory the coding keys used for the signatures, generally the public key of the transmitting airplane, as described below.

Ground station 1 further comprises a communication interface 20, software means for digital signature 30 and signature verification 40, software means 50 for management of the database 11 and a keyboard- and screen-type user interface 60, allowing a user to operate the software means and to access the database 11.

The interface 20 in particular allows communication with Ethernet-type data-processing networks, to a central management base 26 (network 21), to a pre-boarding room 27 for the airplane pilots (network 22) and to the airplanes $3_i$, possibly in flight or on the ground (networks 23 and 24, for example SATCOM or Gatelink) or with removable means 28 for storage (link 25) of USB-key type. As a variant, ACARS networks of VHF or VDL2 type can be used to communicate with the airplanes (links 23 and 24) so as to ensure a greater geographic coverage.

Software means 30 and 40 implement a parallel management of coding keys, in particular with regard to lists for revocation and updating of certificates.

The interface 50 allows access to the database 11 and in this way ensures the generation of new unique identifiers for each new datum or new file, for example an EFF file 2, stored in the database. For example, concatenation of a unique identifier of ground station 1 with a unique identifier of data in the station can be used. File search functionalities also are provided in order to allow selection of the data to be transmitted to the airplanes.

Through interface 60, the user can control various detailed operations such as:
storage of data to be sent;
consultation of data available in base 11 that can be sent;
sending of data to one or more users, here airplanes $3i$;
management of the database 11;
verification of the signatures received by virtue of the software 40, as described below.

These software means and interfaces can be implemented in the form of a data-processing library, a plug-in ("plug-in") or an API, which interface with the already existing applications and systems.

Figure 6:
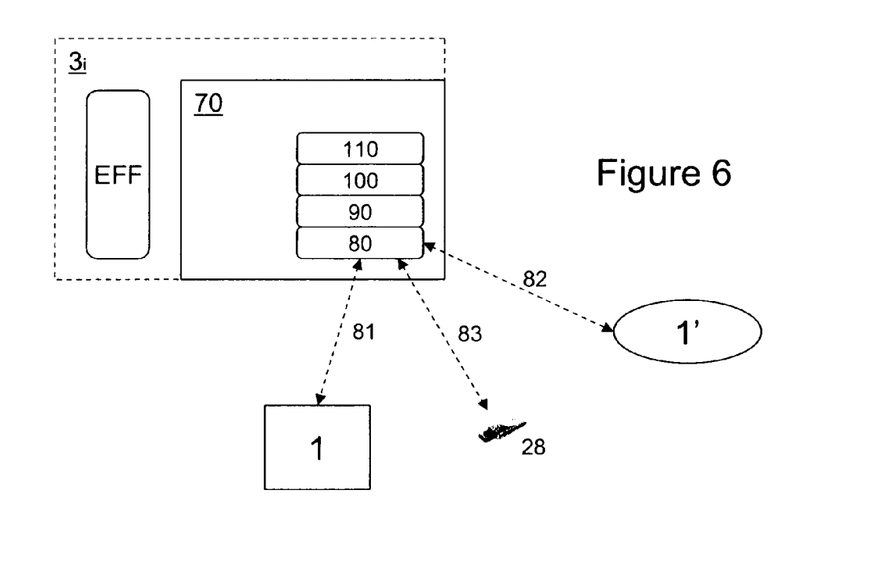
FIG. 6 shows an example of aeronautical implementation of the system according to the invention, centered on the remote entity of FIG. 3.

The remote entity employed for the invention, here airplanes $3_i$, has been shown on FIG. 6.

Data exchange equipment 70 installed on board airplanes $3_i$, also is employed by data-processing means of microprocessor type and associated memories.

This equipment 70 comprises a communication interface 80 similar to the interface 20 of ground station 1, software means 90 for digital signature verification, software means 100 for digital signature and a user interface 110, in particular with the pilot of the airplane $3_i$.

Interface 80 is provided in particular for communicating with ground station 1 as noted above (network 81 identical to the links 23 and/or 24 above), with another source 1' for data or EFF files (network 82) and with USB-key type removable physical storage means, an external hard disk, portable computer (link 83 similar to link 25 introduced above).

Interface 110 allows the pilot to manage the loaded EFF flight folder, in particular to produce manually, at end of flight, a signature for same before transmission to ground station 1.

Figure 7:
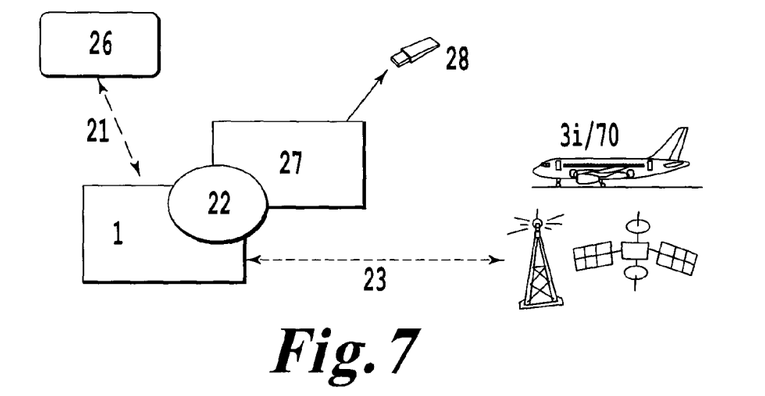
FIGS. 7 to 9 illustrate the different steps employed by the invention in the use of an electronic flight file.

FIG. 7 illustrates the preparation of the EFF flight folder 2 before the flight. Central regulation base 26 of the airline company prepares the EFF flight file 2 by entering data into the database 11 with the aid of appropriate tools and technical documentations available. The file constituted in this way can be sent directly to airplanes $3_i$.

The pilots themselves generally participate in the flight file 2, with the aid of computers in the briefing room 27 and interfaced with the database 11, in order to complement it with a precise flight plan. The complements are stored in the database 11 which, it is recalled, assigns a unique identifier to each datum or set of data (a file for example).

The pilot then can control the sending of the EFF files 2 concerning his flight to his airplane $3_i$ through network 23, the files being accompanied by their assigned unique identifiers.

As a variant, the transfer of the EFF files 2 can be performed manually by the pilot who retrieves same on a movable medium 28 from a computer in the briefing room, and who takes it into the airplane himself in order to load the files 2 therein.

The transfer of data to the airplane will be described in greater detail below with reference to FIGS. 10 to 12.

Figure 8:
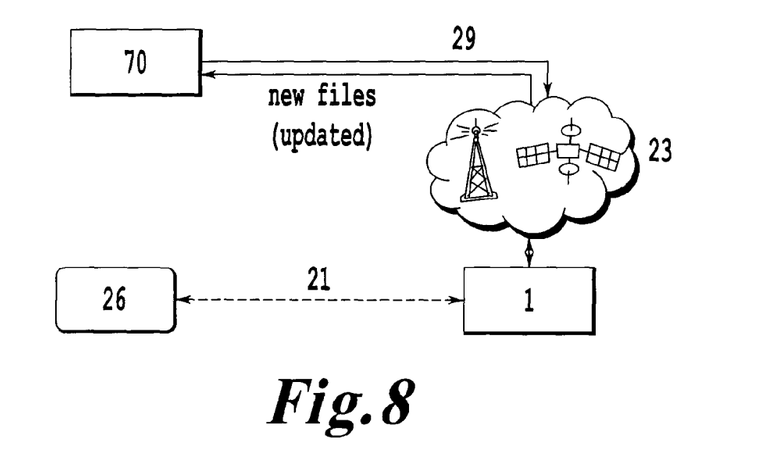

FIG. 8 illustrates an optional phase of updating the files on board the airplane $3_i$. This operation can be performed whether the airplane is on the ground or in flight.

Two main situations are encountered.

On the one hand, the central regulation base 26 updates an electronic file 2 in the database. A new identifier then can be assigned to the updated version of the file. The latter then is sent automatically to the airplanes $3_i$.

On the other hand, the pilot, on his initiative, can request (29) updates or consult the files available in the database 11 of station 1 or of another station 1' and copy them in order to use them.

Figure 9:
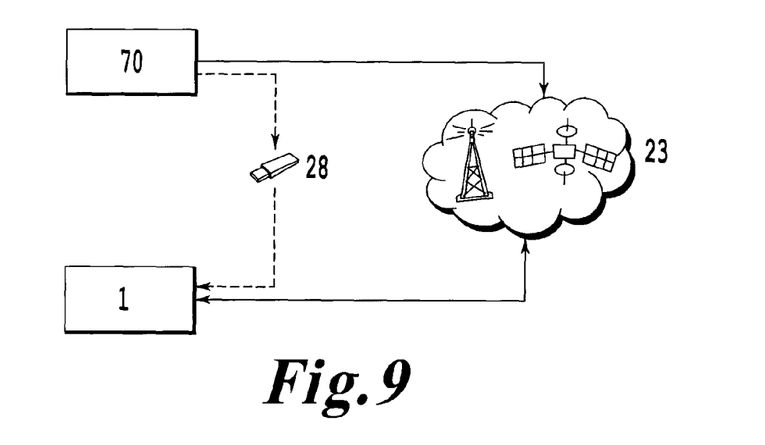

FIG. 9 illustrates the steps of transmission after the flight, that is, when the ground station 1 retrieves the signatures 10 of the flight folders 2. In this case, airplane $3_i$ is on the ground. As already noted above, the signatures and identifiers of the signed data generally are sent by means of the standard Gatelink or SATCOM type communication link 23. As a variant, the pilot can retrieve these signature and identifier information items 10 on the removable medium 28 and take them himself to the processing computer of ground station 1.

Airplane-ground data transmissions and data signatures now are described in greater detail with reference to FIGS. 10 to 12.

Figure 10:
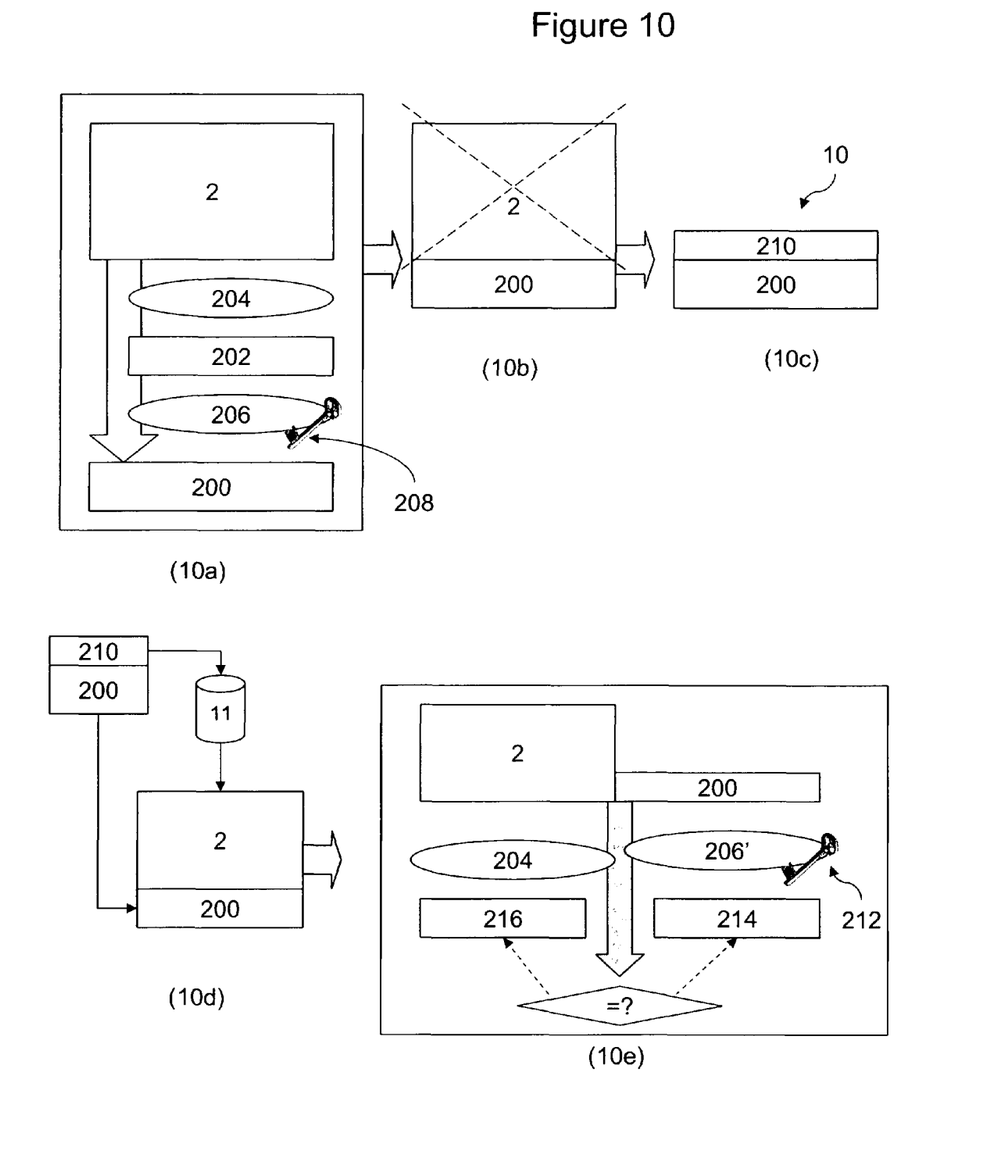
FIG. 10 shows the development of a digital signature according to the first embodiment of the invention of FIG. 3.

FIG. 10 illustrates a simple transmission and signature embodiment. In this case, the data of EFF file 2 have been transmitted during step 4 (see FIGS. 1 and 3), received by interface 80 and stored in a memory (not shown) of airplane $3_i$.

At end of flight, application 100 on board airplane 3, calculates (step 10a) a digital signature 200 of these data 2. This digital signature calculation usually comprises the calculation of an imprint 202 by a hash-type function 204, for example SHA-1 or 2 ("Secure Hash Algorithm 1 or 2") or an MD5 ("Message-Digest algorithm 5") type function, then the coding of this imprint by a coding algorithm 206 using a coding key 208.

It is noted that the function used to create imprints can depend on the type of information or data to be transmitted. For example, the imprints of text files generally are small while ensuring an integrity of the data, whereas the imprint of an image generally is much larger in order to ensure the same integrity.

Preferentially, an infrastructure with public keys, known under the terminology PKI ("Public Key Infrastructure") is chosen, in which key 208 is a private key. In general, this private key 208 is personal for the pilot. It nonetheless can be considered that this key 208 be linked to the system, here the airplane $3_i$.

In a second step 10b, the system 70 on board the airplane removes the initial data 2 from the signed data resulting from step 10a. In this way, one has only the signature 200.

In step 10c that follows, the system 70 adds the unique identifiers 210 of data 2 to this signature 200. These identifiers are either included in the data 2 and retrieved accordingly, or transmitted at the same time as the data 2 by the ground station 1.

The airplane 3i then transmits the whole formed by the signature 200 and the identifiers 210 to the ground station 1 as explained above (step 17 above).

Upon receipt of these data, ground station 1 retrieves in database 11, by virtue of identifiers 210, the corresponding EFF 2 data (step 10d). Ground station 1 then verifies, in step 10e and with the aid of verification software 40, that the received signature 200 corresponds to the data initially transmitted (step 4).

In order to do so, software 40 decodes the signature 200 received with a coding key 212, generally the public key associated with the private key 208, so as to obtain an imprint 214. At the same time, a second imprint 216 is calculated from the initial data 2 retrieved in step 10d and from an appropriate hash function, that is, identical to the one 204 used in the airplane. The verification ends with the comparison of the two imprints 214 and 216 which must be the same in order to validate that the pilot and the airplane $3_i$ indeed used the EFF 2 data initially transmitted and stored locally in the database 11 of ground station 1.

In the event of difference between the two imprints, the ground station 1 can request airplane 3 to resend thereto the signature 200 and the identifiers 210. In this way the ground station 1 detects possible losses of integrity of the transmitted data 200 and 210.

Figure 11:
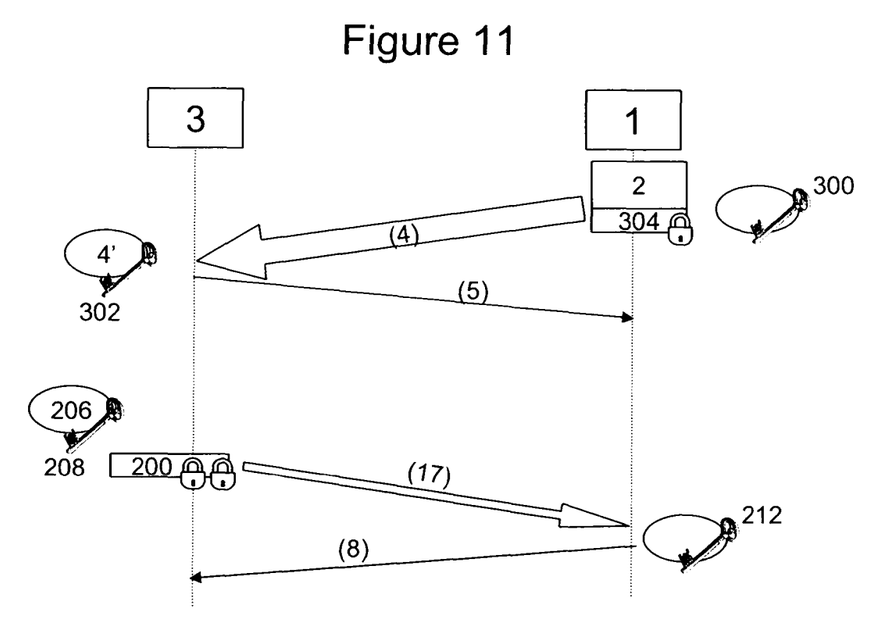
FIG. 11 illustrates, by exchanges of a communication, a second embodiment of this invention.
Figure 12:
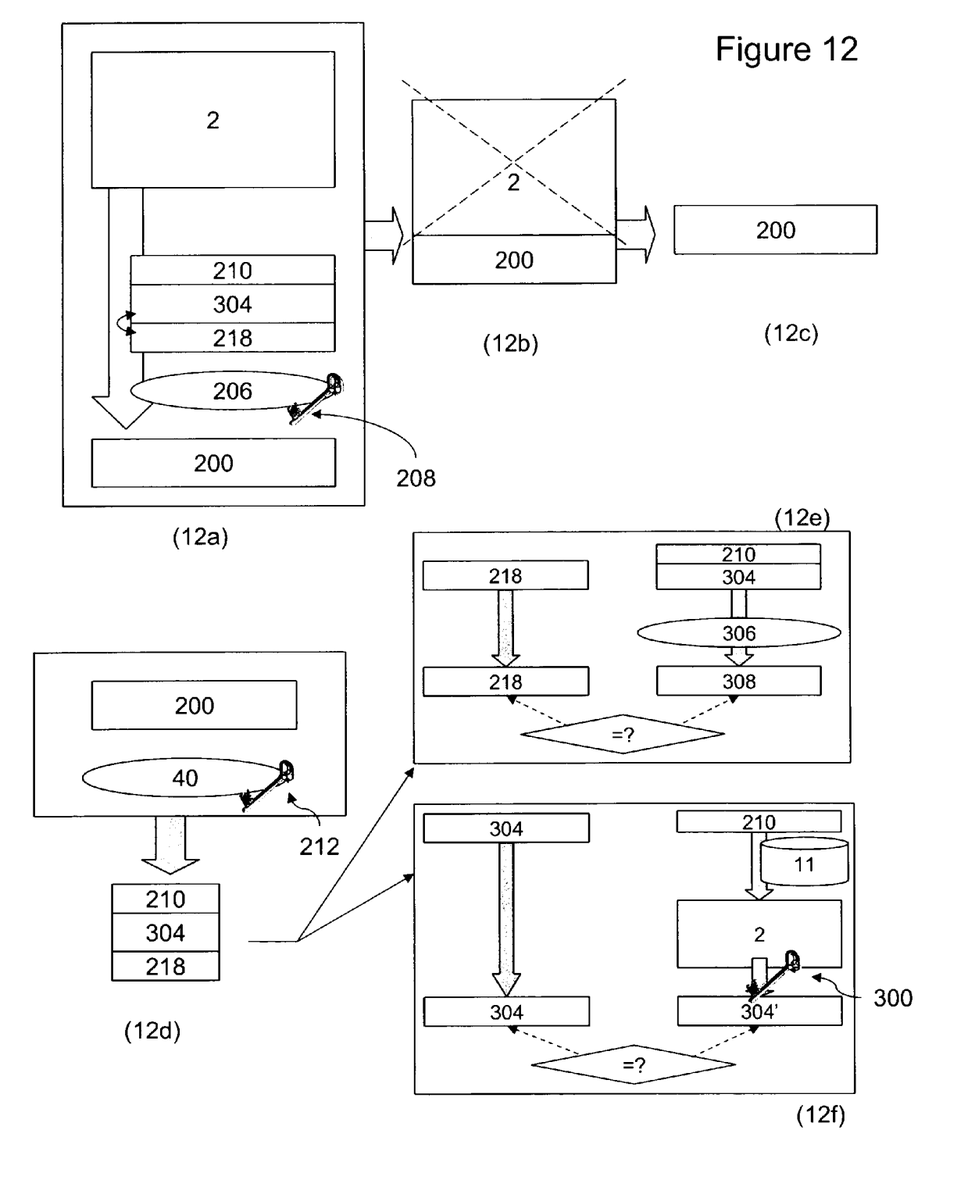
FIG. 12 shows the development of a digital signature according to the second embodiment of the invention of FIG. 11.

FIGS. 11 and 12 describe a more complex embodiment of the exchanges between airplane $3_i$ and ground station 1.

With reference to FIG. 11, it is provided that the EFF data 2 initially are signed by ground station 1 by means of software 30. PKI-type coding mechanisms also are used here with a private key 300 and a public key 302. The data 2 and the signature 304 generated with the aid of the key 300 then are sent to the airplane $3_i$ during step 4.

Software 90 on board airplane 3, then conducts a step 4' in the course of which, upon receipt of signed data 2+304, it verifies the signature 304 with the public key 302 of ground station 1. This verification plays a dual role: verification of the integrity of the transmitted data and guarantee of the authenticity of the sender. This guarantee lies in particular within the framework of a process of non-repudiation of exchanges between the ground station 1 and airplanes $3_i$.

In the event of negative verification, the airplane $3_i$ can request resending of the signed data 2 and 304 by ground station 1.

Thus the flight takes place only once the integrity of the data 2 and the authenticity of the sender have been validly verified.

After the flight, the on-board system 70 prepares the signature of the data, with the aid of the encoding key 208, before transmission to the ground station 1.

FIG. 12 illustrates this signature.

During a first step 12a, software 100 calculates the signature. First the received signature 304 is used as imprint 202. In this way, recalculating this imprint 202 by the hash function 204 is avoided.

The identifiers 210 of the initial data 2 are concatenated with this imprint 304. Then a "sub"-imprint 218 of the whole formed by the data 304 and 210 is calculated. Such an imprint can be calculated by a hash function, for example of redundancy type such as the mechanism for control of cyclic redundancy or CRC ("Cyclic Redundancy Check").

Then the whole formed by the imprint 304, the identifiers 210 and the sub-imprint 218 is coded with the aid of the coding key 208 as explained above in connection with FIG. 10. In this way the signed data 2, that is, with the signature 200, are obtained. The latter comprises, among other elements, the imprint of the data 2 doubly signed by private keys 208 and 300. In this way a mechanism of non-repudiation of exchanges of data 2, that is, the authenticity of the two parties to the exchanges is ensured.

In a manner similar to step 10b, the data 2 are removed from the signed data during step 12b. There is obtained the signature 200 alone, which is transmitted to ground station 1 (step 17).

Upon receipt of the signature 200 by the ground station 1, the signature verifier 40 decodes, first (step 12d) with the aid of public key 212, the signature 200 so as to retrieve identifiers 210, imprint 304 and sub-imprint 218.

In a step 12e, ground station 1 verifies the integrity of the received data with the aid of the sub-imprint 218.

A function 306 for calculating a CRC-type imprint similar to the one used in airplane 3 here is applied on identifiers 210 and imprint 304 so as to provide a second sub-imprint 308. The two sub-imprints 218 and 308 then are compared. The integrity of the data is validated if the two imprints are the same.

In the event of non-integrity, the ground station 1 can request airplane 3 to resend thereto the digital signature 200.

Once the integrity of the data is verified, ground station 1 verifies the signature 304 of the data during step 12f.

In order to do so, it retrieves the data 2 in the database 11, with the aid of the identifiers 210 received and decoded. In a manner similar to the initial signature operation (before transmission 4), ground station 1 recalculates an imprint of EFF data 2 and codes it according to key 300. In this way it obtains imprint 304' similar to the one that was transmitted during step 4.

It then compares this second imprint 304' with the received one 304. The data 2 and therefore the EFF flight folder are properly signed if these two imprints are the same.

The use of the PKI infrastructure in the implementation of the invention has the advantage of simplifying management of the keys (which are not generated at each communication session) and management of the communication sessions during which the doubly signed data generally are sent again much later than the first transmission (a wait of at least the duration of the flight).

The applications of signature verification (40) on the ground station 1 are adapted for functioning even when the files signed by the airplane are received much later than the transmission of these files to the airplanes (a few hours later, at end of flight).

It is seen that the examples of FIGS. 10 and 12 correspond to two configurations fairly far away from one another. Nonetheless, there is considered combining, independently, all or part of the mechanisms presented above, in particular:

signature or non-signature of the documents 2 by the key 300 at the ground station 1. The imprint 202 then is either an imprint calculated directly from the data 2 (if no signature by the key 300) or the signature 304 received. During step 12f, ground station 1 calculates the imprint of the data 2 with the aid of a function similar to the one used in the airplane (if no signature by the key 300) or recalculates the signature of the data 2 by the key 300 as explained above (in the other case);

attaching or not attaching the identifiers 210 to the imprint 202 so as to integrate them into the message coded by the key 208. This integration makes it possible in particular to protect the transmission of these information items against the insecurity of certain communication networks;

generating or not generating a "sub"-imprint 218 based on imprint 202 and possibly identifiers 210. As noted above, this sub-imprint makes it possible to simplify (reduction of resources used and calculation time) control of the integrity of the data since from then on it is possible to dispense with recalculating the imprints of the voluminous initial data 2. This "sub"-imprint 218 can be based only on imprint 202 or received signature 304, without including identifiers 210 therein even if the latter are retained within the coded data.

The main advantage imparted by the invention lies in the fact that the signature 10 (imprint) of the data is much smaller (in bits) than the signed data themselves. To accomplish this, care is taken to choose signature mechanisms having a significant saving in data volume according to the type of data to be processed or the security desired (in general, for the same algorithms, a longer imprint is less susceptible to collisions).

For example, the aforementioned MD5 standard, used to create signature imprints on the Internet, makes it possible to produce 128-bit imprints from any size file 2.

To illustrate this saving in data, there is considered the signature of 10 files of approximately 500 kb (kilobytes) with the aid of the MD5 mechanism. The table below provides an indication of the data volume then transmitted during steps 7 (prior art—FIG. 1) and 17 (according to the invention—FIGS. 3 and 11).

|  | Volume transmitted during step 7 (state of the art) | Volume transmitted during step 17 (with the invention) |
| --- | --- | --- |
| Signature of one file of 500 kb | approximately 500 kb | <0.1 kb |
| Signature of ten files of 500 kb | approximately 5000 kb | <1 kb |

According to the data to be signed (more or less short files) and the signature mechanisms (redundancy, security, length of imprints, etc.), a division of the data volume transmitted ranging between 2 and 10,000 has been observed.

The preceding examples are merely embodiments of the invention which is not limited thereto.

In particular, instead of using remote communication means (networks 23, 24 and 81), data transfer between airplane 3 and ground station 1 can be performed with the aid of USB-key type removable mediums 28 connected directly either to interface 20 or to interface 80, depending on the circumstances.

In particular, the use of the USB key 28 can be combined with the remote communication means for choosing the USB key 28 only when these communication means are not available (network occupied, congested, etc.).

Also, it is common for pilots on board airplane 3 to be led to modify their flight folder and therefore the data 2. In this case, it is advisable to so inform the ground station 1 in order that the latter can generate a new identifier 210 and associate the received signatures with the modified data and not the original ones.

In the case of structured data, the modifications introduced can be listed easily. Thus, on the one hand the original file 2, and on the other hand the modifications introduced, are available.

In this case, during transmission 17 of the signature to the ground station 1, a file of the modifications as well as the signature of the modifications is added to the signature of the original file sent.

Ground station 1 then reconstitutes the modified data with the aid of the original file 2 retrieved in database 11 as indicated above and of the modifications file received.

The identifier 210 is associated with any folder allowing the implementation of the invention. In this way, upon any creation of a new file, the author can apply to the ground station 1 to obtain this identifier.

The invention claimed is:

1. Communication method comprising:
   receiving digital data by at least one aircraft from a ground station, prior to a flight, the digital data including predetermined information generated at the ground station corresponding to the flight, the at least one aircraft performing the flight based on the digital data received from the ground station,
   receiving by the at least one aircraft at least one identification information item identifying the received digital data,
   after the flight, digital signing said digital data received by said aircraft prior to the flight to generate a digital signature, and
   transmitting said digital signature to the ground station after the flight without transmitting any of the received and signed digital data to the ground station,
   wherein said digital signature is transmitted with the received at least one identification information item identifying said received and signed digital data, said identification information item being of lesser size than said received digital data.

2. Communication method according to claim 1, wherein the signing in order to generate the digital signature comprises:
   determining a fingerprint of said digital data received by said aircraft,
   calculating integrity data of said fingerprint, and
   coding said fingerprint and the integrity data, with the aid of a coding key.

3. Communication method according to claim 2, wherein said coding also is performed on said at least one identification information item.

4. Communication method according to one of claims 1 and 2, wherein said at least one identification information item is juxtaposed with the digital signature so as to form a data file to be transmitted to said ground station.

5. Communication method according to claim 1, further comprising, prior to said receipt of the digital data by the aircraft:
   signing the digital data with a first signature by said ground station, and
   transmitting, by the ground station to the aircraft, the digital data and the first signature, wherein
   said signing by the aircraft is performed on said first signature to form a double signature.

6. Communication method according to claim 1, wherein a plurality of aircraft receive digital data, and each aircraft transmits a digital signature of the received data accompanied by an identification information item for the received digital data to the ground station, and
   said ground station stores, in a database, a set of signatures of the plurality of aircrafts with said identification information items, and stores a sole copy of each digital datum so that the ground station can link a received signature with a copy held locally.

7. Communication method according to claim 1, wherein, upon receipt of the digital signature accompanied by the identification information item the ground station sends out to the sending aircraft, a request for the digital data identified in said identification information item when no copy of the digital data is stored in said ground station.

8. Communication method according to claim 1, wherein the digital data is an electronic flight folder including information for the flight to be performed by the at least one aircraft.

9. Communication method according to claim 1, further comprising:
   modifying, by a user, elements of the digital data during the flight.

10. Communication method according to claim 1, further comprising:
    storing, at the ground station, the transmitted digital signature and corresponding identification information item together with the digital data originally sent to the at least one aircraft and identified by the transmitted identification information item.

11. Communication system within an aircraft comprising:
    means for receiving digital data on a communication network from a ground station, prior to a flight, the digital data including predetermined information generated at the ground station corresponding to the flight, the aircraft performing the flight based on the digital data received from the ground station,
    means for receiving at least one identification information item identifying the received digital data,
    means for digitally signing, after the flight, said digital data received prior to the flight to generate a digital signature, and
    means for transmitting said digital signature on said communication network to the ground station after the flight without transmitting any of the received and signed digital data to the ground station,
    wherein said digital signature is transmitted with the received at least one identification information item identifying said received and signed digital data, said identification information item being of lesser size than the received digital data.

12. Aircraft comprising:
    a communication system that implements the communication method according to claim 1.

13. Airport system comprising:
    a plurality of aircraft according to claim 12,
    the ground station, said ground station being capable of storing a copy of the digital data transmitted to said aircraft,
    means for receiving the digital signature and the at least one identification information item sent out by said aircraft,
    a local searching unit that searches, based on the received identification information item, for a copy of the digital data transmitted to said aircraft, and
    means for verifying, based on the copy found, said digital signature received from the aircraft.

14. Communication method according to claim 8, wherein the electronic flight folder includes a flight plan for the flight to be performed by the at least one aircraft.

15. Communication method according to claim 1, wherein the at least one identification information item identifying the received digital data is received from the ground station.

* * * * *